United States Patent [19]

Sakaguchi et al.

[11] Patent Number: 4,867,388
[45] Date of Patent: * Sep. 19, 1989

[54] MAGNETIC TAPE WINDING DEVICE

[75] Inventors: Masaaki Sakaguchi; Mitsunobu Usui, both of Kanagawa, Japan

[73] Assignee: Fuji Photo Film Co., Ltd., Kanagawa, Japan

[*] Notice: The portion of the term of this patent subsequent to Nov. 8, 2005 has been disclaimed.

[21] Appl. No.: 56,012

[22] Filed: Jun. 1, 1987

[30] Foreign Application Priority Data

May 30, 1986 [JP] Japan .................. 61-124959

[51] Int. Cl.⁴ .............................. G11B 5/84
[52] U.S. Cl. .................. 242/67.1 R; 242/76; 226/93
[58] Field of Search ........... 242/67.1 R, 76, 78, 242/78.1, 179, 186; 226/93–97; 360/66; 335/303, 286

[56] References Cited

U.S. PATENT DOCUMENTS 3,899,762  8/1975  Studders ..................... 335/302
4,512,527  4/1985  Rehklau et al. ............. 242/56 R

FOREIGN PATENT DOCUMENTS 51642  6/1986  Japan .

Primary Examiner—Stuart S. Levy
Assistant Examiner—Steven M. DuBois
Attorney, Agent, or Firm—Sughrue, Mion, Zinn, Macpeak & Seas

[57] ABSTRACT

A tape winding device for a magnetic tape in which an annular magnet surrounds a drive shaft of a take-up reel. The magnet is supported on a side opposite the reel by a ferromagnetic support.

9 Claims, 5 Drawing Sheets

MAGNETIC TAPE WINDING DEVICE

BACKGROUND OF THE INVENTION

1. Field of the Invention

This invention relates to a magnetic tape winding device which is used in the case where a predetermined length of a magnetic tape is wound on a small tape reel from magnetic tape roll stock, or in the case where the magnetic tape wound on a tape reel is rewound on another tape reel, or in the case where a magnetic tape is wound to form a magnetic tape roll stock, or in the case where a magnetic tape roll stock wider than a magnetic tape product is cut into a plurality of magnetic tape roll stocks different in tape width, and the magnetic tapes of the roll stocks thus obtained are wound on the tape reels.

2. Background of the Invention

The manufacture of magnetic tapes such as audio cassette tapes, video cassette tapes, memory tapes and broadcasting video tapes include intermediate manufacturing steps such as a step of winding a predetermined length of a magnetic tape onto a tape winding structure such as a tape reel or hub from a magnetic tape roll stock, a step in which a magnetic tape wound on a tape winding structure is rewound on another tape winding structure, a step of winding a magnetic tape to form a magnetic tape roll stock, and a step in which a magnetic tape roll stock wider than a magnetic tape product is cut into a plurality of magnetic tape roll stocks different in tape width, and the magnetic tapes of the roll stocks thus obtained are wound on the tape winding structures.

When the magnetic tape is wound on the tape winding structure in the tape winding step or in the tape rewinding step, depending on the properties of the magnetic tape roll stock on the tape delivery side, or the properties of the tape winding structure on the tape winding side, or the properties of the magnetic tape itself, the magnetic tape is vibrated in the direction of its thickness or width. That is, the so-called "tape behavior" varies, as a result of which the magnetic tape wound on the tape winding structure has an unsatisfactory appearance. That is, the winding surface (formed by the tape edges) of the magnetic tape wound on the tape winding structure is uneven as viewed in the axial direction of the tape winding structure. This tendency is significant when the tape winding speed is high.

If the magnetic tape thus unneatly wound is placed, for instance, in a magnetic tape cassette case, the resultant magnetic tape cassette is low both in appearance and in quality. Furthermore, the magnetic tape is liable to curl or its edge is liable to be damaged, with the results that various troubles are induced or the electromagnetic conversion characteristic is lowered. The above-described difficulty that a magnetic tape is unneatly wound is a serious problem, for instance, for video magnetic tape for high density recording operation, because audio signals and synchronizing signals rerecorded along the tape edge.

Therefore, in a conventional magnetic tape manufacturing operation, after the above-described magnetic tape winding or rewinding step, the external appearance of each roll of magnetic tape is, for instance, visually inspected to determine whether or not, in each of the magnetic tape rolls, the tape has been neatly wound on the tape winding structure. The time and cost required for the visual inspection greatly lower the efficiency of manufacturing the magnetic tape efficiency.

In the operation of winding a magnetic tape which is liable to be unneatly wound, in order to reduce the burden of the visual inspection or to improve the external appearance of the magnetic tape roll, a so-called "dress winding method" as shown in FIG. 1 or 2 has been employed in the art.

FIGS. 1 and 2 are perspective views outlining the arrangement of a tape winding structure 2 and its relevant components on the tape winding side. In the case of FIG. 1 a flexible endless belt 11 of rubber or polymide rotatably is held by rollers 12, 13 and 14. The flexible belt 11 is turned together with a magnetic tape T while elastically strongly pushing the tape's magnetic surface radially inwardly of the tape winding structure 2 so that the magnetic tape T is neatly wound on the tape winding structure. In the case of FIG. 2, a belt 15 of relatively soft unwoven cloth is provided between one of the flanges of a tape winding structure 2 and the winding surface (formed by the tape edges) of a magnetic tape T. The belt 15 is first wound on the belt forwarding side. While the belt 15 thus wound is supported by rollers 17 and is being rewound on the belt winding side 18 at a predetermined low speed, the magnetic tape T is thereby pushed axially inwardly of the tape winding structure 2 so that the magnetic tape is neatly wound on the tape winding structure 2.

In each of the methods shown in FIGS. 1 and 2, the belt 11 and 15 directly touches the magnetic tape T. Therefore, the methods suffer from difficulties that the magnetic layer is scraped or fibers come off the unwoven cloth, thus resulting in the occurrence of dropouts, or the magnetic tape is pushed so greatly that the tape edge or the tape itself is damaged. That is, the methods cannot be employed as the case may be. Furthermore, the above-described dress winding mechanism greatly consumes itself, thus providing another difficulty that the maintenance cost is increased. In addition, the dress winding mechanism is disadvantageous in the following points. The magnetic tape winding device must be so designed that, in replacing the tape winding structure 2, the dress winding mechanism can be moved from the operating position to the standby position and vice versa. That is, the device becomes correspondingly intricate in construction. Furthermore, in such a magnetic tape winding device, the replacement of the tape winding structure takes a relatively long time, and the time required for the movement of the dress winding mechanism obstructs improvement of the productivity.

Two cassette tape winding systems have been employed in the art. One of the two systems is a so-called "open winding system" in which a magnetic tape wound by the aforementioned dress winding method is inserted in a cassette case, to form a magnetic tape cassette. The other is a so-called "in-cassette winding system, or C—0 winding system, or V—0 winding system" in which a magnetic tape is wound in the final step of the cassette assembling work.

The latter system will be described with reference to FIGS. 3 and 4. All components except for a magnetic tape are built in a cassette case 23. More specifically, a tape winding structure on the tape delivery side and another tape winding structure on the tape winding side are fastened through a leader tape 10 to each other. The so connected tape winding structures, are inserted in the cassette case 23, and the cassette case 23 is tightened with screws, thus providing a semi-finished product of a magnetic tape cassette (generally referred to as "V—0" or "C—0"). With a tape winding device called an "in cassette winder", the leader tape 10 is pulled out of the semi-finished product and cut into two parts which are fastened to the two tape winding structures, respectively. The end of one of the leader tapes is spliced to the end of the magnetic tape to be wound. The other leader tape is kept sucked and retained by a holding member 22. Under this condition, the tape winding structure 2 to the leader tape of which the magnetic tape T has been fastened is turned until a predetermined length of the magnetic tape T is wound on it and then the magnetic tape is cut. The end of the magnetic tape thus fastened and cut is spliced to the end of the other leader tape fastened to the other tape winding structure 3. Thus, the magnetic tape cassette has been manufactured. In the "in-cassette winding system", unlike the above-described method, it is impossible to mechanically touch the magnetic tape on the tape winding structure. Accordingly whether or not the magnetic tape wound is acceptable in external appearance depends on the properties of the magnetic tape and the accuracy of the cassette components. That is, it is completely impossible to control the winding operation thereby to wind the magnetic tape neatly on the tape winding structure. In order to precisely wind the magnetic tape on the tape winding structure, a method has been employed in which, as shown in FIG. 4, a roller 24 having flanges 25 at both ends is arranged at the inlet of the cassette so that a force is exerted on the magnetic tape which is being wound in its widthwise direction. That is, the magnetic tape is pushed towards its one flange. However, if, in this method, a strong force is applied to the magnetic tape, it may damage the tape edge. On the other hand, an application of a weak force thereto cannot make the magnetic tape acceptable in appearance when wound. That is, the method still has a problem to be solved.

Recently, a magnetic tape winding device as shown in FIG. 5 has been proposed in the art (cf. Japanese Patent Application (OPI) No. 51642/1986 (the term "OPI" as used herein means "an unexamined published application"). In the device, a winding drive shaft 30 is detachably engaged with the winding hub 41 of a winding reel 40 which is made up of the winding hub 41 and a flange 42. At least one magnet 31 is mounted on the winding drive shaft 30 in such a manner that the magnet is located on one side of the flange 42 which is opposite to the other side where a magnetic tape T is wound, so that the magnetic tape T is wound on the winding reel 40.

However, the device is still disadvantageous in that, since in order to wind the magnetic tape neatly on the tape winding structure by using the magnetic field as was described above, the magnetic field should be as high in strength over a wide an area as possible, it is necessary to use a large magnet, and the maintenance cost is increased as much.

This invention shares some common features with commonly assigned Japanese Patent Application 123808/86.

SUMMARY OF THE INVENTION

In view of the foregoing, an object of this invention is to provide a magnetic tape winding device which can wind even a magnetic tape neatly which is not uniform in property.

Another object of the invention is to provide a magnetic tape winding device which eliminates the above-described difficulties that a conventional magnetic tape winding device employing the above-described dress winding system in which the magnetic tape is mechanically touched is unavoidably intricate in construction and that the magnetic tape wound is lowered in quality by secondary effects as described above. Also, the magnetic tape winding efficiency should be increased.

A further object of the invention is to provide a magnetic tape winding device with which, even in the in-cassette winding system for which no means for winding a magnetic tape neatly has heretofore been provided, a magnetic tape can be neatly wound, and even a magnetic tape large in width which is used to provide magnetic tape roll stocks can be wound neatly.

A still further object of the invention is to provide a magnetic tape winding device which is loser in maintenance cost.

The foregoing objects of the invention have been achieved by the provision of a magnetic tape winding device in which a tape winding structure is rotated to wind a magnetic tape thereon. According to the invention, at least in the vicinity of the tape winding structure, a magnet for forming a magnetic field substantially in the direction of width of the magnetic tape to be wound is supported by a supporting member made of ferromagnetic material.

DETAILED DESCRIPTION OF THE PREFERRED EMBODIMENTS

One embodiment of this invention will be described in detail.

Figure 1:
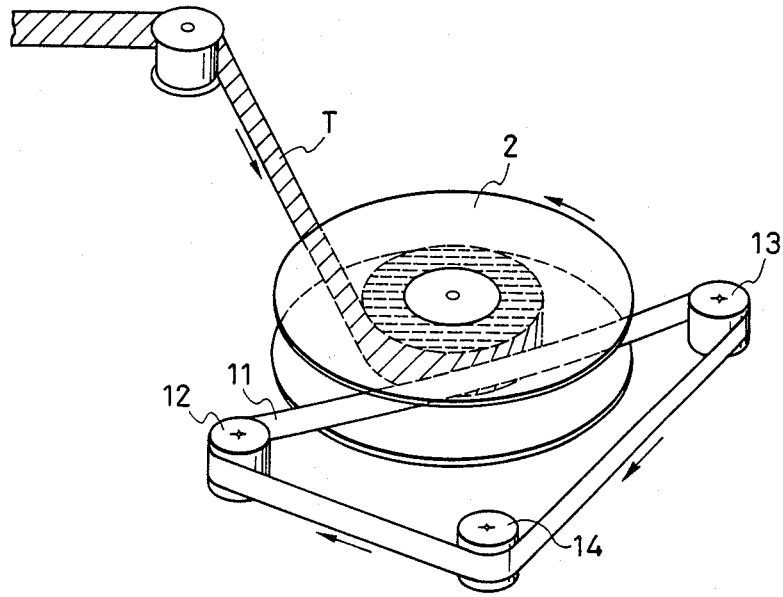
FIGS. 1 and 2 are perspective views showing parts of respective examples of a conventional magnetic tape winding device.
Figure 2:
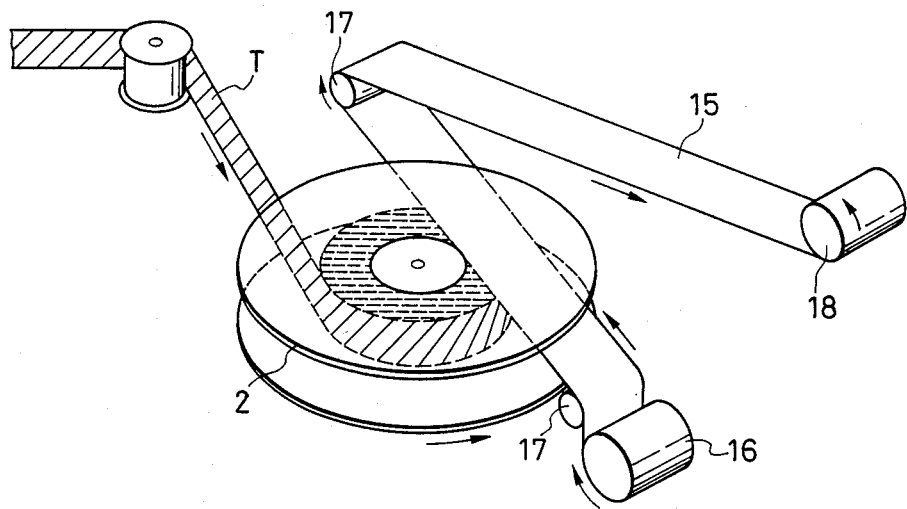
Figure 3:
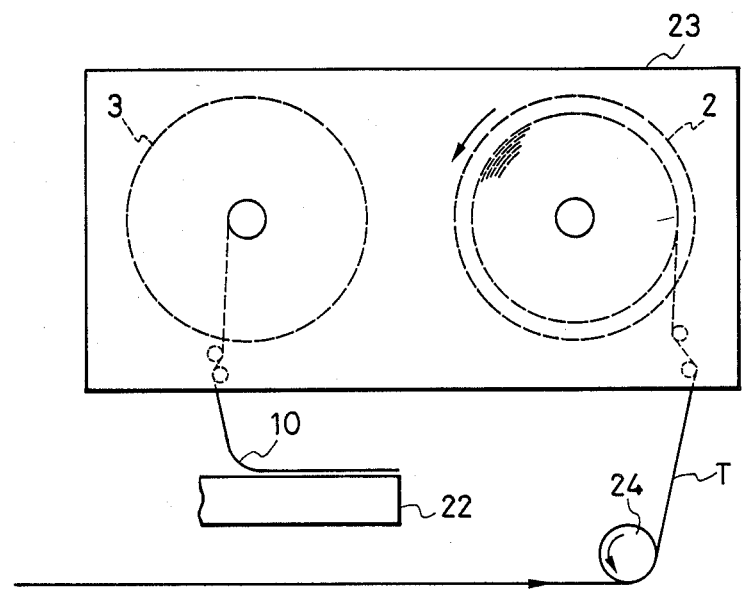
FIG. 3 is a plan view outlining the arrangement of a conventional magnetic tape winding device of in-cassette winding type.
Figure 4:
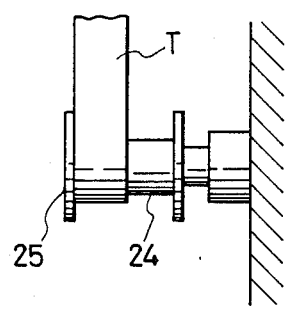
FIG. 4 is an enlarged side view showing essential components in FIG. 3.
Figure 5:
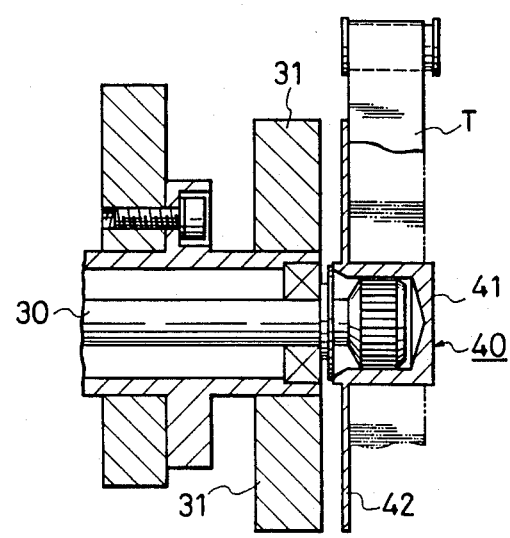
FIG. 5 is a sectional view outlining part of the conventional winding device.
Figure 6:
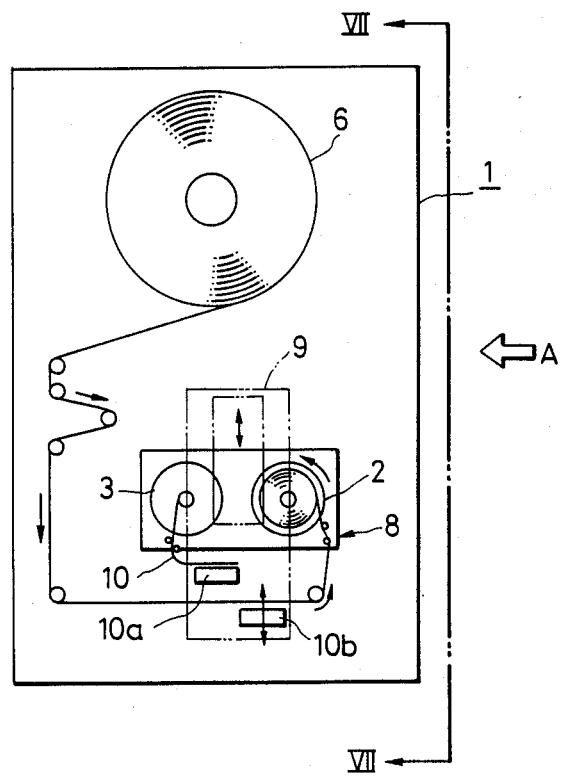
FIGS. 6 and 7 are a front view and a side view, respectively, outlining the arrangement of one example of a magnetic tape winding device according to this invention.
Figure 7:
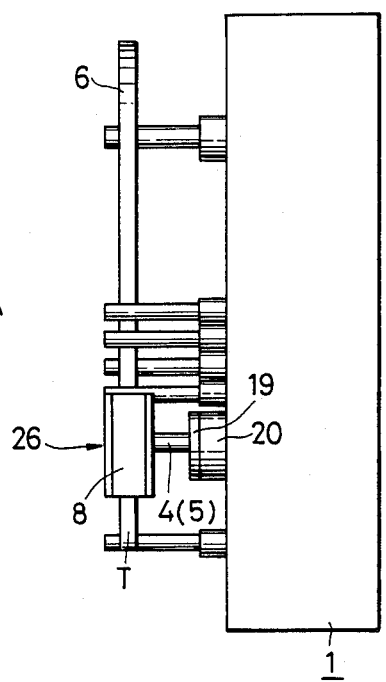

FIG. 6 is a front view outlining the arrangement of one example of a magnetic tape winding device of in-cassette winding type. FIG. 7 is a side view of the device as viewed in the direction of sectional line VII—VII in FIG. 6. The device is used to wind a magnetic tape T on a pair of tape winding structures 2 and 3 (hereinafter referred to as "tape reels 2 and 3", when applicable) which have been previously enclosed in a video tape cassette case of VHS or Bata system, to thereby provide a video tape cassette as s product.

The operation of the magnetic tape winding device 1 will be briefly described.

The tape reels 2 and 3 which are fastened to each other through a leader tape 10 having a predetermined length. A cassette case enclosing the tape reels 2 and 3 is held by a holding mechanism 26 of the tape winding device 1. Under this condition, the holding mechanism 26 is moved so that drive shafts 4 and 5 are inserted into the respective tape reels 2 and 3 form below.

Thereafter, the leader tape 10 is cut into two substantially equal part. The end of the leader tape 10 of the take-up tape reel 2 is spliced to the end of the magnetic tape T fed from a magnetic tape roll stock 6 by using a spicing tape or the like. After being wound a predetermined length on the take-up tape reel 2, the magnetic tape T is cut. The end of the magnetic tape thus spliced and cut is fastened to the end of the leader tape 10 of the other tape reel 3.

The operations of cutting the leader tape 10 and the magnetic tap T, and of splicing these tapes 10 and T are carried out with cutting and a splicing means 9 which has tape end holding member 10a and 10B, a cutter and a splicing tape. The magnetic tape T supplied from the magnetic tape roll stock 6 is wound on the tape reel 2 while being conveyed along a path including guide pins and guide rolls. The cutting and splicing means is not shown in FIG. 7.

Figure 8:
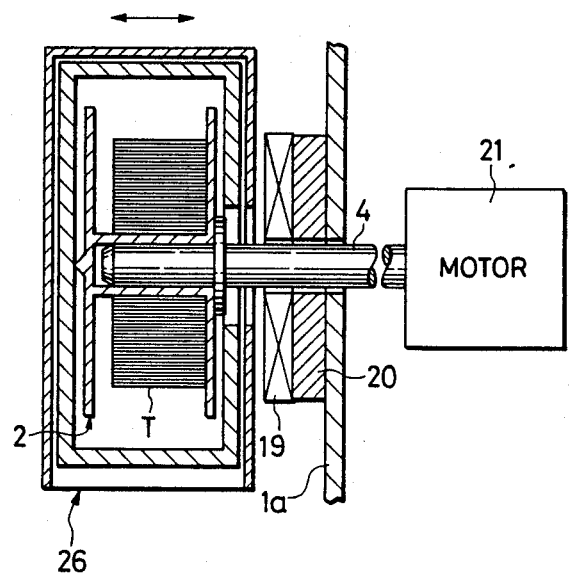
FIG. 8 is an enlarged sectional view showing a part of FIG. 7 in detail.
Figure 9:
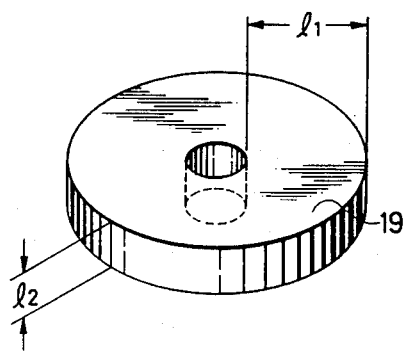
FIG. 9 is an enlarged perspective view of a magnet in FIG. 7.

The arrangement described so far is similar to that of the conventional device. However, it should be noted that the specific feature of the invention resides in a part provided below the holding mechanism 26. In particular as show in FIG. 8, a permanent magnet 19 is mounted through a supporting member 20 of ferromagnetic material on the front panel 1a of the winding device 1 in such a manner that the permanent magnet 19 is put on a winding drive shaft 4 on the magnetic tape (T) winding side. The permanent magnet 19 is, for instance, in the form of a ring as shown in FIG. 9, and its width $l_1$ is equal at least to the final winding width of the magnetic tape T, and its thickness $l_2$ is smaller than that of the magnet in the conventional device. The direction of the magnetic field is substantially coincident with the widthwise direction of the magnetic tape T (or the axial direction of the winding drive shaft 4). The annular upper and lower surfaces of the magnet 19 constitute the two opposed magnetic poles of the magnet 19.

The supporting member 20 is also in the form of a ring, and is made of a ferromagnetic material such as a permalloy containing iron and nickel. The term "ferromagnetic material" as used herein is intended to mean one whose susceptibility is at least $10^{-3}$.

The holding mechanism 26 is substantially in the form of a relatively flat rectangular box. More specifically, the holding mechanism 26 is so shaped that the cassette case 8 can be inserted into the holding mechanism 26 from below, as illustrated in FIG. 8. A member for supporting the holding mechanism 26 is not shown in FIG. 8.

When the magnetic tape T is wound with the winding device thus constructed, the magnetic tape is wound while being pulled by the magnetic force towards the lower flange (i.e., the right-handed flange in FIG. 8) of the tape reel 2. The permanent magnet 19 is low in price, because its thickness $l_2$ is relatively small and its magnetic force is low. However, the magnetic field strength is increased by about 30% to 50% because the supporting member 20 holding the magnet 19 is made of the ferromagnetic material as was described above. Accordingly, the magnetic tape T can be wound while being pulled to the lower flange of the tape reel. That is, it is wound with its edges aligned on one side. Thus, the magnet 19 is sufficiently effective even in the case where the distance between the magnetic tape T and the magnet 19 is limited, or the space of installation of the magnet 19 is limited.

The magnetic force of the permanent magnet 19 is not particularly specified. That is, it should be determined from various conditions such as the tension of then magnetic tape given during the tape winding operation, the kind of the magnetic tape T, the distance between the magnet 19 and the magnetic tape T, the tape winding speed, and the effect of the magnetic field on the magnetic tape T.

In the above-described embodiment, the configuration of the supporting member 20 is such that the supporting member 20 is substantially equal in size (or diameter) to the magnet. However, the invention is not limited thereto or thereby. For instance, the device may be so modified that the size (especially the diameter) of the magnet is smaller than that of the tape reel 2 whereas the diameter of the ferromagnetic supporting member so that the magnet is buried in the supporting member.

Furthermore, in the above-described embodiment, the permanent magnet 19 is mounted on the front panel 1a through the supporting member 20 However, the invention is not limited thereto or thereby. For instance, the device may be so modified that the front panel 1a is made of ferromagnetic material in its entirety, or at least a part of the front panel 1a which confronts with the magnetic is made of ferromagnetic material. This modification is advantageous in that, in the case where the space for installation of the magnet 19 is small as in the tape winding device of in-cassette winding type, the magnetic force can be increased, and that the device can be simplified in construction. That is, the magnet can be used more effectively.

In the above-described embodiment, the permanent magnet 19 is fixedly position in place. However, the invention is not limited thereto or thereby. That is, the device may be so modified that the magnet 19 is movable along the winding drive shaft 4 to freely change the magnetic force exerted on the magnetic tape T. Furthermore, the permanent magnet 19 is in the form of a disk which is equal to or larger than the flanges of the tape reel 2 in diameter as was described above. However, the invention is not limited thereto or thereby. That is, the permanent magnet is not limited in configuration. All that is required for the permanent magnet is that the permanent magnet can form a magnetic field in a local region of the tape reel 2 which is stable in directivity over the width of a magnetic tape to be wound.

In the above-described magnetic tape winding device 1, the magnet is provided only at the winding drive shaft 4. However, the invention is not limited thereto or thereby. That is, the magnet may be positioned along the magnetic tape conveying path so that the magnetic force is applied in the widthwise direction of the magnetic tape so that the vibration of the magnetic tape in the widthwise direction is suppressed. That is, the magnetic tape is run stably.

In the above-described embodiment or modifications, the permanent magnet is employed to wind the magnetic tape neatly on the tape reel. However, the invention is not limited thereto or thereby. That is, instead of the permanent magnet, an electromagnet may be employed. In this case, the magnetic force can be freely changed by controlling the energization of the electromagnet.

The term "magnet" as used herein can be generalized to include a magnetic field generating means including not only the above-described permanent magnet or electromagnet but also solenoids.

While one embodiment of the invention and its several modifications have been described, it should be noted that the invention is not limited thereto or thereby. That is, as was described in the introductory part of the present specification, the technical concept of the invention is applicable to the case where a magnetic tape roll stock wider than a magnetic tape product is cut into a plurality of magnetic tape roll stocks, and the magnetic tapes from these roll stocks are wound on the tape winding structures. It goes without saying that the technical concept of the invention is applicable to a magnetic tape winding device of open-reel winding type as well as the magnetic tape winding device of in-cassette winding type with has been described above.

As is apparent from the above detailed description, in the device of the invention, the magnet is small in size and its magnetic force is small. However, the magnet is increased in magnetic force being supported by the ferromagnetic supporting member. Therefore, the magnet may be one which is relatively low in price, and can be provided even in a small space, and the magnetic force can be exerted positively on the magnetic tape.

Accordingly, with the magnetic tape winding device of the invention, the magnetic tape can be wound neatly without damaging the tape edges of the magnetic layer, and the magnetic tape winding efficiency can be increased. Especially, the magnetic tape winding device of in cassette winding type can be markedly improved according to the invention.

What is claimed is:

1. A magnetic tape winding device, comprising:
   a tape winding structure having a hub to which a magnetic tape is attached;
   means for rotating said tape winding structure whereby said magnetic tape is wound on said tape winding structure, said rotating means including a drive shaft attachable to said tape winding structure;
   magnetic means disposed in a vicinity of said tape winding structure for applying a magnetic field substantially in a direction along an axial direction of said drive shaft; and
   a supporting mechanism for supporting said magnetic means and enhancing a magnetic field produced by said magnetic means in a region of said magnetic tape as said magnetic tape is wound on said tape winding structure, said magnetic field produced by said magnetic means in a region of said magnetic tape being substantially in a plane of said tape and acting in a widthwise direction of said tape, said supporting mechanism being composed of a ferromagnetic material and disposed solely on a side of said magnetic means opposite said tape winding structure.

2. A tape winding device as recited in claim 1, wherein said magnetic means is permanent magnet.

3. A tape winding device as recited in claim 2, wherein said permanent magnet is disposed on a side of said tape winding structure confronting said drive shaft.

4. A tape winding device as recited in claim 3, wherein said permanent magnet is annular and surrounds said drive shaft.

5. A tape winding device as recited in claim 4, wherein said permanent magnet has an outer periphery extending beyond a maximum diameter of said wound tape on said tape winding structure.

6. A tape winding device as recited in claim 1, wherein said tape winding structure is a first tape winding structure and further comprising a holding mechanism for holding a cassette enclosing said first tape winding structure and a second tape winding structure and said magnetic field is applied through a wall of said cassette.

7. A tape winding device as recited in claim 6, wherein said magnetic means is a permanent magnet and said supporting member has an equal area to that of said magnet in a plane transverse to an axis of said drive shaft.

8. A tape winding device as recited in claim 7, wherein said permanent magnet is an annular magnet surrounding said drive shaft.

9. A tape winding device as recited in claim 6, wherein said supporting member is at least part of an exterior panel of said device.

* * * * *